Jan. 18, 1966  E. W. HENDERSON  3,230,288
METHOD OF PYROLYZING, BLENDING AND EXTRUDING A 1-OLEFIN POLYMER
Filed Sept. 1, 1961
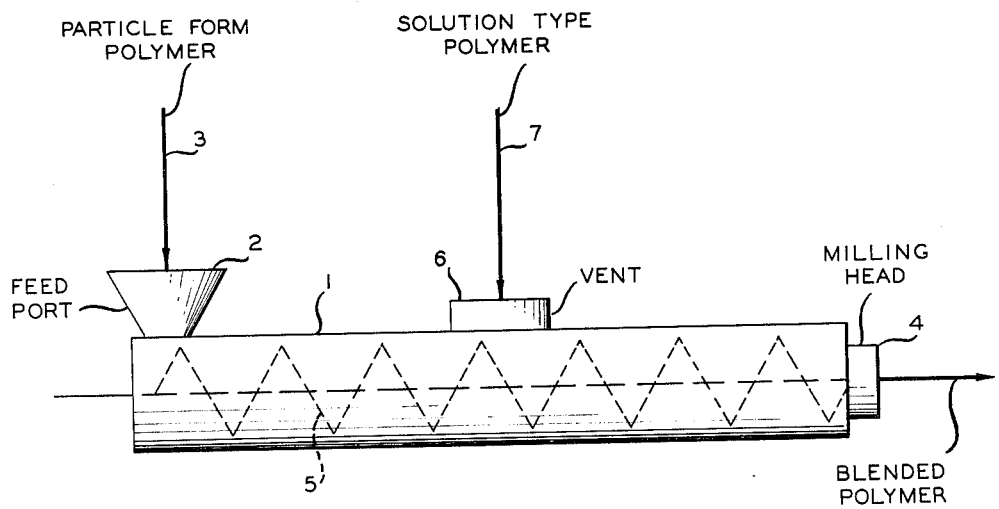
INVENTOR.
E. W. HENDERSON
BY *Hudson and Young*
ATTORNEYS

United States Patent Office 3,230,288
Patented Jan. 18, 1966

3,230,288
METHOD OF PYROLYZING, BLENDING AND EXTRUDING A 1-OLEFIN POLYMER
Eulas W. Henderson, Borger, Tex., assignor to Phillips Petroleum Company, a corporation of Delaware
Filed Sept. 1, 1961, Ser. No. 135,597
4 Claims. (Cl. 264—176)

This invention relates to blends of a pyrolyzed polymer of a 1-olefin and a polymer of a 1-olefin. In one aspect, the invention relates to a method for preparing a blend of a pyrolyzed 1-olefin and polymer of a 1-olefin. In another aspect, the invention relates to a method of cooling a molten pyrolyzed polymer of a 1-olefin.

The polymerization of 1-olefins to solid polymers is well known in the art with one such suitable method being disclosed in U.S. Patent No. 2,825,721, issued March 4, 1958 to Hogan and Banks. Such polymers are noted for their high density and high crystallinity making them suitable for many uses. Recently, it has been discovered there is a critical polymerization temperature range in the broad range disclosed by Hogan et al. in which it is possible to produce increased yields of high molecular weight polymers of ethylene which are insoluble in the hydrocarbon diluent. One method for preparing insoluble particle form polymers is disclosed in the copending application of Leatherman et al., Serial No. 590,567, filed June 11, 1956. The polymers formed by methods such as that of Leatherman et al. are characterized by a low melt index as hereinafter defined. It has been found that pyrolysis of these low melt index polymers extends their usefulness, although other means, e.g. mechanical working, are also employable to achieve the desired degree of molecular degradation. Pyrolysis is frequently conducted at elevated temperatures in the range of 600 to 900° F. for a sufficient period of time to reduce the molecular weight to the desired range. It is thought that this pyrolyzation primarily affects the long chain molecules, thereby decreasing the average molecular weight and increasing the melt index. A suitable method for the pyrolyzation of particle form polymer is disclosed and claimed in the copending application of Canterino and Gallaugher, Serial No. 556,471, filed December 30, 1955. One difficulty in pyrolyzing the polymers at these elevated temperatures is the cooling of the pyrolyzed polymer. The hot (600–900° F.) visbroken polymer is normally too fluid to form satisfactory strands upon extruding through a die. In some instances the hot polymer may actually run down the face of the die and not form strands at all. It is common extruder practice to extend the strands by the application of tension forces. It will be readily seen that if the polymer is excessively fluid, its tensile strength will be insufficient to permit the drawing operation. It will be readily understood that the utilization of conventional heat exchanger means are not completely satisfactory since the polymer has a low coefficient of heat transfer and also since the polymer, upon cooling below the solidification point, tends to foul any heat exchange surface.

It is an object of this invention to provide a novel method of cooling a molten pyrolyzed polymer of a 1-olefin.

It is another object of this invention to provide a novel method of blending a pyrolyzed polymer of a 1-olefin with a polymer of a 1-olefin.

These and other objects of the invention will become more readily apparent from the following detailed description and discussion.

The foregoing objects are realized broadly by cooling a molten pyrolyzed polymer of a 1-olefin by intimately admixing therewith a cooler polymer of a 1-olefin.

In one aspect of the invention, the aforementioned admixing is accomplished in an extruder with the cooler polymer being introduced downstream from the point of introduction of the pyrolyzed polymer.

The olefin polymers referred to herein can be prepared by any known method such as that of Hogan et al., supra, wherein a method is disclosed whereby polymers and copolymers can be produced by contacting one or more olefins with a catalyst comprising as an essential ingredient chromium oxide preferably including a substantial amount of hexavalent chromium. The chromium oxide is associated with at least one other oxide particularly selected from the group consisting of silica, alumina, zirconia and thoria.

The olefins employable for the preparation of normally solid polymers useful in this invention include at least one olefin selected from 1-olefins having a maximum of 8 carbon atoms per molecule and no branching nearer the double bond than the 4-position, including ethylene, propylene, 1-butene, 1-pentene, and 1,3-butadiene. The term polymer includes homopolymers and copolymers, such as ethylene-propylene copolymer and ethylene-butadiene copolymer.

Preferably, the high density polymer of a 1-olefin which is used to cool the pyrolyzed polymer has a density in the range of 0.940 to 0.990 gm./cc., a molecular weight above 25,000 and a melt index of less than 20, preferably 1.0 to 12.

Preferably, the polymer to be pyrolyzed is a particle form polymer of ethylene or mixtures of ethylene with other unsaturated hydrocarbons, for example, mixtures of ethylene with higher amounts of higher 1-olefins, such as propylene, 1-butene, 1-pentene, 1-hexene, and the like and is compatible with the cooling polymers. Preferably, these polymers have a density in the range of 0.920 to 0.990 gm./cc., a melt index of less than 5.0, usually 0.001 to 2.0 (high load melt index).

In order to increase the melt index and improve the processability and extrudability of these particle form polymers, these high molecular weight, highly crystalline polymers are cracked (pyrolyzed) under controlled conditions such as heating the polymer in an inert atmosphere such as nitrogen at atmospheric pressures or slightly reduced pressure, usually not below 600 millimeters of mercury and at an internal temperature of the polymer in the range of 600 to 900° F., preferably 700 to 800° F. for a residence time in the range of from about 1 to about 10 minutes. The polymer is heated rapidly until it is in a molten or liquid state. In some instances, a product of the desired molecular weight, melting point and melt index can be obtained by heating the polymer until it is all in a molten state and then removing the source of heat. In other cases, the molten mass is stirred and heating is continued for a period which generally does not exceed 30 minutes. The time of heating is governed by the temperature employed and the properties of the product desired. In other words, as the temperature is increased a shorter time is employed to achieve the same degree of pyrolysis. One suitable method for pyrolyzing olefin polymer is described in the copending application of Canterino et al, supra.

Preferably, these polymers, after pyrolysis, have a density in the range of 0.920 to 0.990 gm./cc. and a melt index in the range of 0.1 to 80, preferably 0.2 to 50, more preferably 5.0 to 35.

By thus increasing the melt index, sometimes called visbreaking, the low melt index, high molecular weight, highly crystalline particle form polymer is rendered more readily processable and extrudable. However, it is frequently difficult to reduce the temperature of the molten visbroken pyrolyzed polymer from the 600 to 900° F.

temperature utilized in the pyrolyzing operation to the lower temperatures preferred for extruding.

It has now been discovered that by the method of this invention not only can the temperature of the molten pyrolyzed polymer be reduced but the blend of pyrolyzed polymer and high density polymer of 1-olefin which results has properties which are useful. Suitable uses for this blend include detergent bottles, thermoformed articles, fiber and pipe.

The particle form polymer produced by the method of Leatherman et al. and the like can be visbroken and processed or extruded by any suitable type of apparatus by any suitable method. Suitable apparatus include extruders, such as those manufactured by National Rubber Machinery Company or by Welding Engineers, Inc., wherein the temperature is elevated to the desired level and the polymer remains for the desired period of time. The visbroken polymer is then extruded through a slot or die. In one aspect of this invention, a polymer of a 1-olefin which has not been pyrolyzed and which has a temperature less than the molten particle form pyrolyzed polymer is injected into the visbreaking apparatus downstream from the point of introduction of the particle form polymer but upstream from the die or orifice from which the admixture is extruded. It is necessary that the point of injection be chosen so that the polymer has been pyrolyzed to the desired degree before cooling. Preferably, the extruder has a dual feed. In general, the temperature of the molten pyrolyzed polymer at the point of injection is in the range of 600 to 900° F., preferably 700 to 800° F. In general, it is preferred that the polymer of 1-olefin has a density of 0.940 to 0.990 gm./cc. although the so-called low density or high pressure polymers are satisfactory. It is satisfactory and, in some instances preferred, to inject the polymer into the extruder in a solid pelletized form since the difference in temperature is greater thereby increasing the rate of heat transfer and rate of cooling of the molten pyrolyzed polymer. However, it is also within the scope of the invention, and in some instances an improved blend results, to utilize molten polymers to cool the pyrolyzed polymer. Obviously, the polymer temperature is less than that of the pyrolyzed polymer, preferably 50 to 300° F. below the temperatures of the pyrolyzed polymer. In general, this temperature of the inejcted polymer is in the range of 50 to 600° F. with the upper temperature being limited by the decomposition point of the polymer.

The ratio of pyrolyzed 1-olefin polymer to the cooling polymer in the blends of this invention can be at any ratio which effects the desired cooling. Preferably, the ratio is in the range of between 5 parts of pyrolyzed polymer to 95 parts of the cooler polymer and 75/25, preferably in the range 10/90 and 50/50. The preferred ratios within this range are dependent upon the properties of the blend and the rate of cooling desired.

Although the invention is described herein primarily with reference to the utilization of a dual feed extruder for cooling and blending, it is within the scope of this invention to use conventional methods of blending. For instance, the molten pyrolyzed polymer could be transferred to a Banbury mixer and the cooler polymer introduced thereto with proper stirring to effect satisfactory cooling and blending.

When utilizing a dual feed extruder with a die or orifice through which the admixture of polymers is extruded to form strands, films or filaments, etc., it is frequently preferred to extrude the admixture in an atmosphere containing an inert fluid such as nitrogen, water, hot oil and the like. This atmosphere not only assists in the cooling operation but also prevents oxidation which causes the formation of black or dark colored deposits on the die face which flake off in the strands of polymers which is most undesirable.

By the utilization of a molten polymer to cool the pyrolyzed polymer, improved blends are obtained due to the more thorough mixing which is obtainable than by conventional methods such as solution blending.

The method for determining inherent viscosity is to dissolve 0.1000 gram of the polymer in 50 ml. of tetralin at room temperature. The viscosity of the solution at 130±0.2° C. is then determined by means of an Ostwald-Fenske viscosimeter (size 50, 0.8–3.0 centistokes). The viscosity of tetralin is also determined under these conditions, and the relative viscosity, $Vr$, of the polymer solution to the solvent is calculated. Molecular weight is then calculated by the formula:

$$Mw = \frac{K(2.303) \log Vr}{C}$$

where $Mw$ is molecular weight, $K$ is $2.445 \times 10^4$, $Vr$ is the relative viscosity as above, and $C$ is 0.183 gram per 100 cc. (that is, the concentration is corrected for the expansion of the tetralin from room temperature to 130° C.). This method is essentially the same as reported by Kemp and Peters, Ind. & Eng. Chem., 35, 1108 (1943).

Density as used herein is determined by compression molding a slab of the polymer, cooling said molding at a temperature reduction rate of 15 to 20° F. per minute to room temperature, cutting a pea-sized specimen therefrom, and placing such specimen in a 50 ml. glass stoppered graduate. Carbon tetrachloride and methylcyclohexane are added to the graduate in burettes in proportions such that the specimen is suspended in solution. During the addition of the liquids, the graduate is shaken to secure thorough mixing. When the mixture just suspends the specimen, a portion of the liquid is transferred to a small test tube and placed on the platform of a Westphal balance and a glass bob lowered therein. With the temperature shown by the thermometer in the bob in the range 73 to 78° F., the balance is adjusted until the pointer is at 0. The value shown on the scale is taken as the specific gravity.

For melt index, the method of ASTM D-1238-52T is used with 5 runs being run at 2 minute intervals, averaging 5 weights, discarding any values which deviate from the average by more than 5 weight percent, reaveraging and multiplying by 5 to obtain the amount of extrudate in 10 minutes. If the melt index is low, such as less than 1.0, the high load melt index may be obtained by ASTM D-1238-57T (Procedure 5) using a weight of 21,600 grams. Unless specified otherwise, all references herein to melt index refer to the former.

Although frequent reference is made herein to the melting point of the thermoplastic material, a more readily determinable physical characteristic is the freeze point which will quite often be synonymous with the melt point, particularly with amorphous materials. For purposes of this discussion and the definitions contained herein, the melt point will be considered as determined by the method used to determine freeze point and will for all purposes herein be considered synonymous. Crystalline freeze points are determined by melting a sample of the polymer, inserting a thermocouple into the molten polymer and allowing the molten polymer to cool slowly. The temperature is recorded and plotted versus time. The crystalline freeze point is the first plateau in the time versus temperature curve.

In a specific embodiment of the invention, best illustrated in the drawing, a particle form copolymer of ethylene-butene-1, produced at a temperature of 192–198° F., 425 p.s.i.g., a butene-1 concentration of 8–20.5 percent with a catalyst (of Hogan et al., supra) containing 1.25% Cr by the method of Leatherman et al., supra, and having a density of 0.938 gm./cc. and a high load melt index of 2.05 *, is fed from conduit 3 into the nor- ---
*Other properties:
 Flexural modulus—111,000; ASTM D-790-49T
 Stiffness—117,000 p.s.i.; ASTM D-747-58
 Izod impact—3.65 ft. lb./in.; ASTM D-256-47T
 Tensile @ yield—3084 p.s.i.; ASTM D-638-52T
 Tensile @ buak—3100 p.s.i.; ASTM D-638-52T
 Elongation—434%; ASTM D-638-52T.

mal feed port 2 of a 2½" 24:1 L/D National Rubber Machinery Company vented extruder 1 equipped with milling head 4. The particle form polymer is plasticized and visbroken in the first stage section of the screw 5 between the feed port and the vent 6 reaching a temperature of approximately 725° F. Pellets of a copolymer of ethylene and butene-1 produced by solution polymerization at 290–310° F., 500 p.s.i.a. and a ethylene feed concentration of 95% and having a density of 0.949 gm./cc. and a melt index of 6.63 ** are fed into the extruder vent 6 from conduit 7 at ambient temperature and blended with the visbroken particle form polymer in the second stage of the screw. The screw speed is 70 r.p.m. with an extruder cylinder temperature in the range of 825–400° F. decreasing to the lower figure at the discharge end. The average feed rate of the particle form polymer is 40 pounds per hour and 65 pounds per hour for the pellets. The extrudate has a temperature of 555° F. with the average extruded product rate being 105 pounds per hour. The blend has a melt index of 0.25, a density of 0.946 gm./cc., and an average particle form polymer percentage of 38 percent. The blown film appearance is very good with very few fisheyes. Fisheyes indicate the presence of unmelted, unblended, or undispersed particle form polymers in the blend. The rating of good is considered equivalent to Banbury blended samples.

While certain examples, structures, composition and process steps have been described for purposes of illustration, the invention is not limited to these. Variation and modification within the scope of the disclosure and the claims can readily be effected by those skilled in the art.

I claim:
1. A process for extruding a polymer of a 1-olefin having a molecular weight above 25,000, said process comprising the steps of introducing said polymer into a pyrolysis zone; elevating the temperature of said polymer to a temperature in a range of 600–900° F. within said pyrolysis zone; maintaining said temperature for a period of time sufficient to reduce the molecular weight of said polymer to a range of 2,000–12,000; admixing with said pyrolyzed polymer downstream of said pyrolysis zone a polymer of a 1-olefin having a temperature less than that of the pyrolyzed polymer whereby said pyrolyzed polymer is cooled and extruding the resulting admixture.

2. The process of claim 1 wherein said cooler polymer comprises a molten polymer of ethylene having a temperature in the range of 260–600° F.

3. The process of claim 1 wherein said cooler polymer comprises a solid polymer of ethylene having a temperature in the range of 50–260° F.

4. The process of claim 1 wherein said admixture is extruded into an atmosphere containing an inert cooling fluid selected from the group consisting of an inert gas, water or inert oil.

---

Other properties:
Izod impact—0.7 ft. lb./in.; ASTM D-256–47T
Tensile @ yield—3800 p.s.i.; ASTM D-638–52T
Elongation—20%; ASTM D-638–52T.

References Cited by the Examiner
UNITED STATES PATENTS

| | | | |
|---|---|---|---|
| 2,868,762 | 1/1959 | Oakes | 260—897 |
| 2,994,679 | 8/1961 | Jones et al. | 260—897 |
| 3,086,958 | 4/1963 | Canterino et al. | 260—897 |

MURRAY TILLMAN, *Primary Examiner.*

LEON J. BERCOVITZ, *Examiner.*